United States Patent [19]

Daniel et al.

[11] 3,832,911

[45] Sept. 3, 1974

[54] ENERGY ABSORBING STEERING COLUMN

[75] Inventors: Roger P. Daniel, Dearborn; Alex Rhodes, West Bloomfield Twsp., both of Mich.

[73] Assignee: Ford Motor Company, Dearborn, Mich.

[22] Filed: Dec. 4, 1972

[21] Appl. No.: 311,982

[52] U.S. Cl. .................................................. 74/492
[51] Int. Cl. ............................................. B62d 1/18
[58] Field of Search ............................. 74/492, 493

[56] References Cited
UNITED STATES PATENTS

| | | | |
|---|---|---|---|
| 3,505,897 | 4/1970 | Scheffler et al. | 74/492 |
| 3,540,304 | 11/1970 | Weiss | 74/492 |
| 3,590,655 | 7/1971 | Farrell | 74/492 |
| 3,641,834 | 2/1972 | Barenyi | 74/492 |
| 3,709,057 | 1/1973 | Kitzner et al. | 74/492 |

Primary Examiner—Allan D. Herrmann
Attorney, Agent, or Firm—Keith L. Zerschling; Clifford L. Sadler

[57] ABSTRACT

An energy absorbing steering wheel support for a motor vehicle according to an embodiment of this invention includes a steering column outer tube with a telescopic steering shaft rotatably supported therein. A deforming assembly and a releasable support assembly connect the column tube to vehicle support structure. The deforming assembly has projections which engage preformed grooves in the surface of the column tube. The projections are constructed to plastically deform the tube upon its axial displacement and thereby absorb most of the energy of an impact load upon the column. The releasable assembly secures the steering column assembly to the vehicle support structure during normal operation of the steering system and is constructed to release the column for forward displacement when subjected to a breakaway force exceeding a predetermining minimum value caused by an impact. The steering wheel is supported on the upper end of the steering shaft. A convoluted energy absorbing can is situated between the end of the steering column tube and the hub of the steering wheel. The convoluted can is supported only at its forward end where it engages the outer column tube and does not normally carry torsional or bending loads. The convoluted can is constructed to absorb the initial portion of an impact load on the column.

1 Claim, 7 Drawing Figures

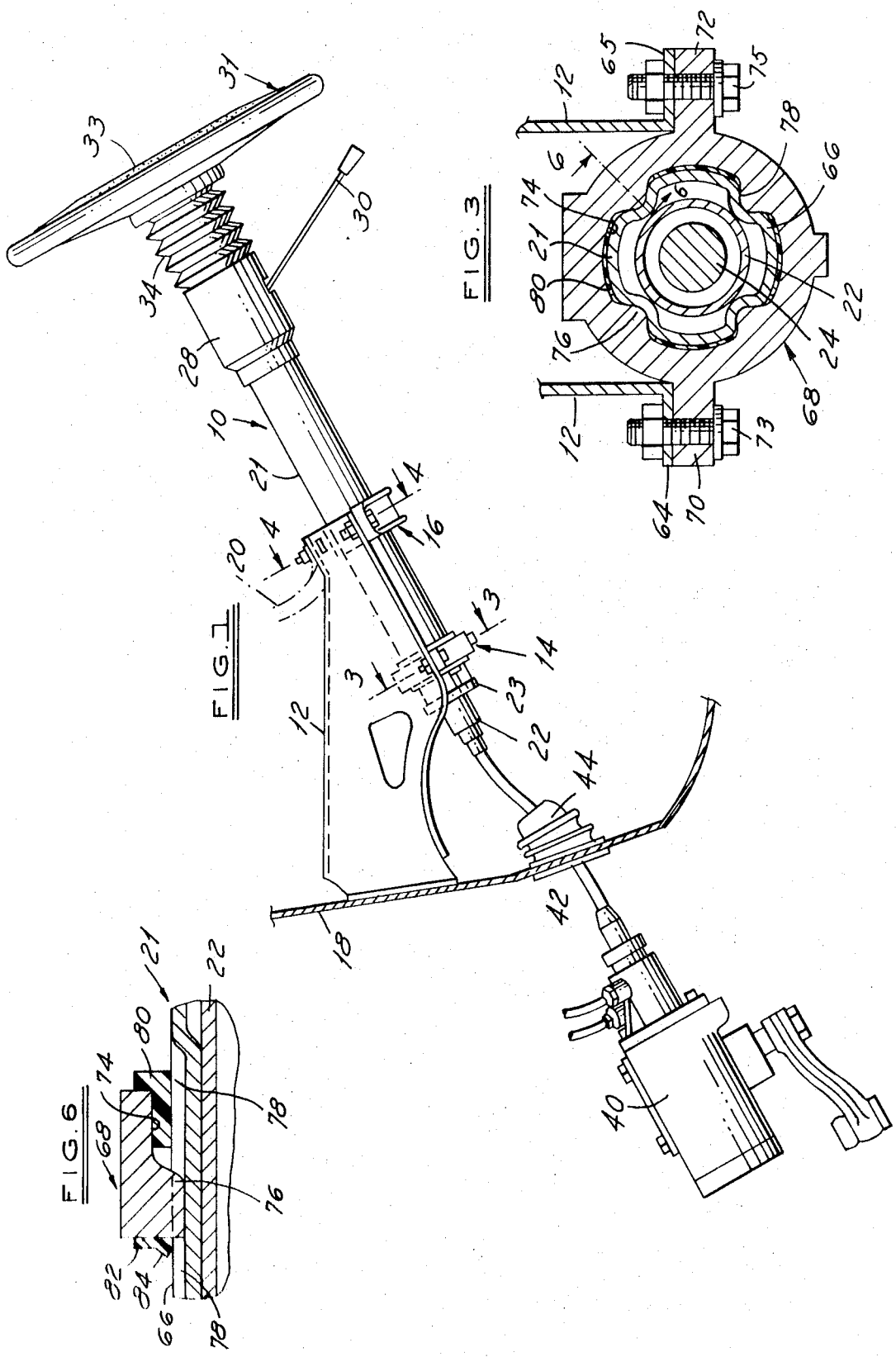

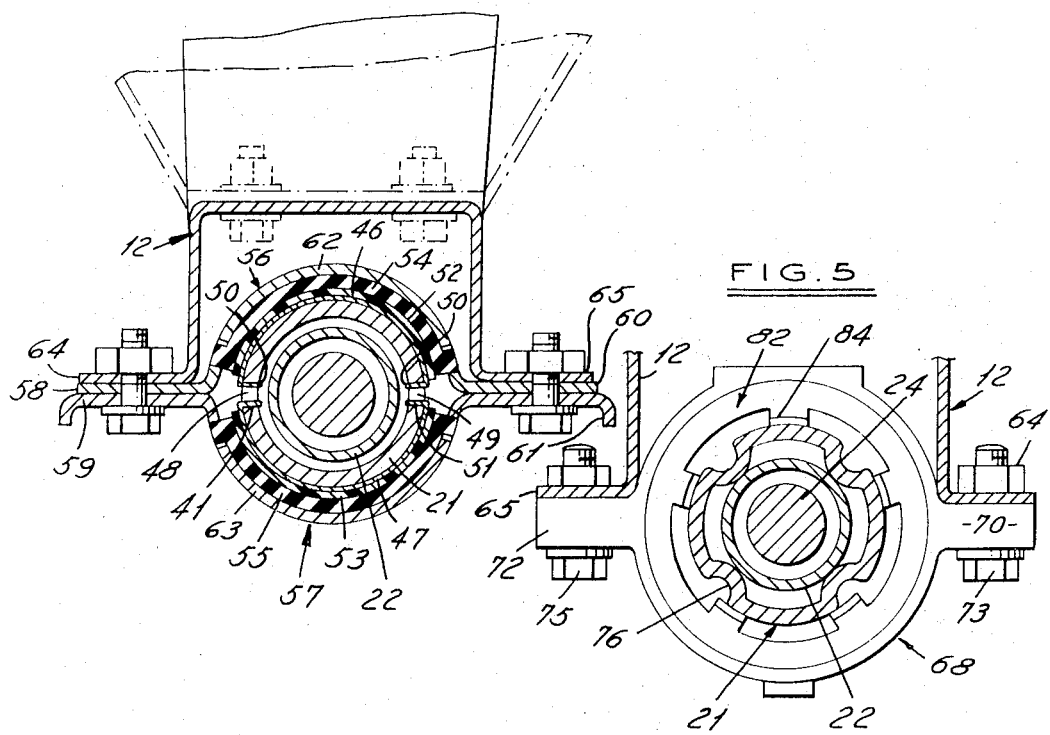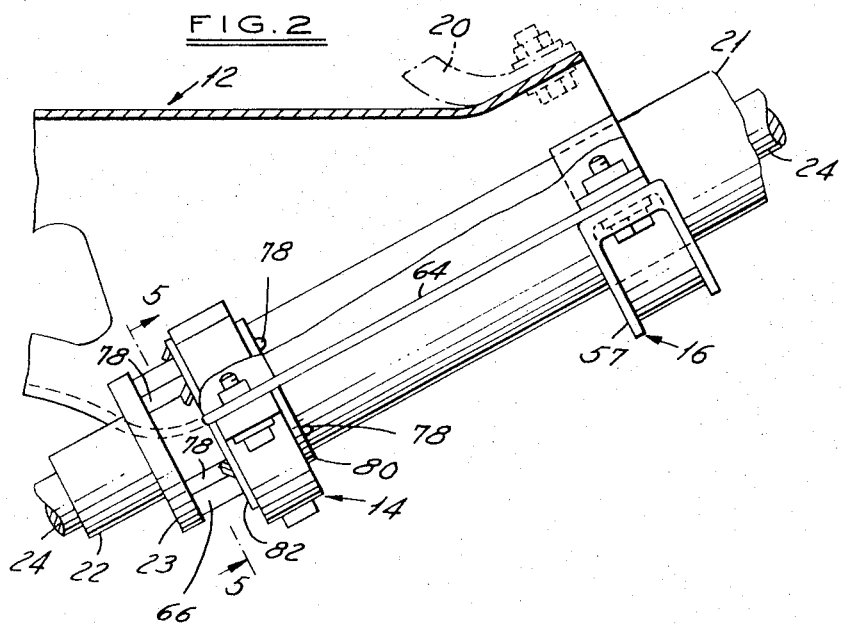

ENERGY ABSORBING STEERING COLUMN

BACKGROUND OF THE DISCLOSURE

The present invention is particularly concerned with an energy absorbing steering wheel support that is constructed to plastically deform at a controlled rate and thereby absorb an impact load upon the steering wheel. Certain prior art steering columns that are designed to absorb energy are objectionable because of their complexity. A steering column according to the present invention more than adequately performs the function of absorbing energy while being characterized by its simplicity of construction and economy of manufacture.

The prior art includes energy absorbing steering wheel supports having a corrugated or pleated annular member that forms a driving connection between the steering wheel and the steering shaft or a stationary extension of the column tube which rotatably supports the steering shaft. In both of these types of prior art structures, the energy absorbing member serves the dual function of carrying a torsional or bending load and serving as a plastically deformable energy absorbing element.

It is an object of the present invention to provide an energy absorbing steering wheel support that is spaced both from the wheel and the steering shaft and which serves the sole function of absorbing the energy of an impact by plastic deformation.

BRIEF SUMMARY OF THE DISCLOSURE

The present invention provides, in one of its preferred embodiments, an energy absorbing steering column having an outer tube mounted on vehicle support structure by spaced apart fore and aft support assemblies. Both assemblies secure the column to the support structure during normal operation of the steering system in the vehicle. The two assemblies may be characterized as a deforming assembly and as a releasable guiding assembly in accordance with their function during steering column collapse under an impact load.

The lower or forward support assembly has deforming means that includes a series of inwardly extending projections which engage, with an interference fit, axially extending grooves in the surface of the outer tube of the column. The grooves extend rearwardly of the projections for a predetermined distance. The projections are constructed to plow extensions of the grooves after the column has been displaced forwardly the predetermined distance.

The upper or rearward support assembly includes a guide means that releasably supports the outer steering column tube. This assembly supports the column tube under normal vehicle driving loads and is constructed to release its supporting grip upon the tube during column displacement under an impact load. It also serves to loosely guide the tube while it is being displaced.

The outer column tube rotatably supports a two-piece telescopically collapsible steering shaft assembly. The forward end of the steering shaft assembly is constructed to be connected to a steering gear. The rearward end of the steering shaft protrudes from the outer column tube and has a padded steering wheel secured to it. A convoluted energy absorbing can surrounds the protruding end of the steering shaft and has its forward end affixed to the rearward end of the column tube.

The convoluted can is spaced from both the hub of the steering wheel and the steering shaft. Thus, the convoluted can is supported only at its forward end and does not carry any bending or torsional load.

A steering column assembly, in accordance with this invention, provides a plurality of components for absorbing the energy resulting from an impact against the steering wheel. The energy absorbing functions of the several components of the column occur in a serial or consecutive fashion. The column construction prevents high peak loads from being imposed upon an object impacting the steering wheel. The column, therefore, provides a uniform resistant to the impact as its components deflect and deform.

when a forwardly directed major impact load is imposed upon the steering wheel, the forces directed to the various components of the steering column will cause a series of consecutive functions to be performed or events to occur, as follows: (1) the energy absorbing padding on the steering wheel will deflect, (2) the breakaway connection interconnecting the sections of the steering shaft will fracture, (3) the steering wheel and upper steering shaft section will accelerate forwardly into engagement with the convoluted can, (4) the convoluted can will plastically deform to absorb an initial portion of the impact load, (5) the releasable support for the column tube will "breakaway" or release its grip upon the column and the column assembly will accelerate forwardly until it achieves a speed coinciding with the speed of the object impacting upon the steering wheel, and (6) the projections of the deforming means will engage the ends of the grooves and plow extensions of the grooves in the surface of the column tube. The plastic deformation of the surface of the column tube will absorb a major portion of the kinetic energy of the object striking the steering wheel.

Thus, the major energy absorbing force will occur after the breakaway force and after the inertial force have reached zero. The breakaway force is that force necessary to cause the rearward support assembly to release its grip of the column outer tube and the inertial force is that force necessary to accelerate the mass of the column up to the speed of the object impacting the steering wheel.

The convoluted can functions as an effective energy absorber for the initial phase of the impact load because it does not carry torsional loads or bending loads as is common in prior art structures using convoluted cans. In accordance with this disclosure, the convoluted can can be carefully designed for the sole purpose of absorbing an impact load by plastic deformation. The design need not be comprised by providing additional undesirable strength that might otherwise be necessary if the can were required to carry torsional or bending loads.

BRIEF DESCRIPTION OF THE DRAWINGS

The many objects and advantages of the present invention will become apparent upon consideration of the following detailed description and the accompanying drawings, in which:

FIG. 1 is a side elevational view of a steering column assembly installed in a motor vehicle and constructed in accordance with this invention;

FIG. 2 is an enlarged side elevational view of a mid-portion of the steering column of FIG. 1;

FIG. 3 is a sectional view taken along section line 3—3 of FIG. 1 and showing the tube deforming assembly;

FIG. 4 is a sectional view taken along section line 4—4 of FIG. 1 and showing the releasable guiding assembly for the column tube;

FIG. 5 is a sectional view taken along section line 5—5 of FIG. 2;

FIG. 6 is a sectional view taken along section line 6—6 of FIG. 3 and showing the tube deforming projections engaging the outer tube of the steering column.

DETAILED DESCRIPTION OF THE PREFERRED EMBODIMENT

Figure 7:
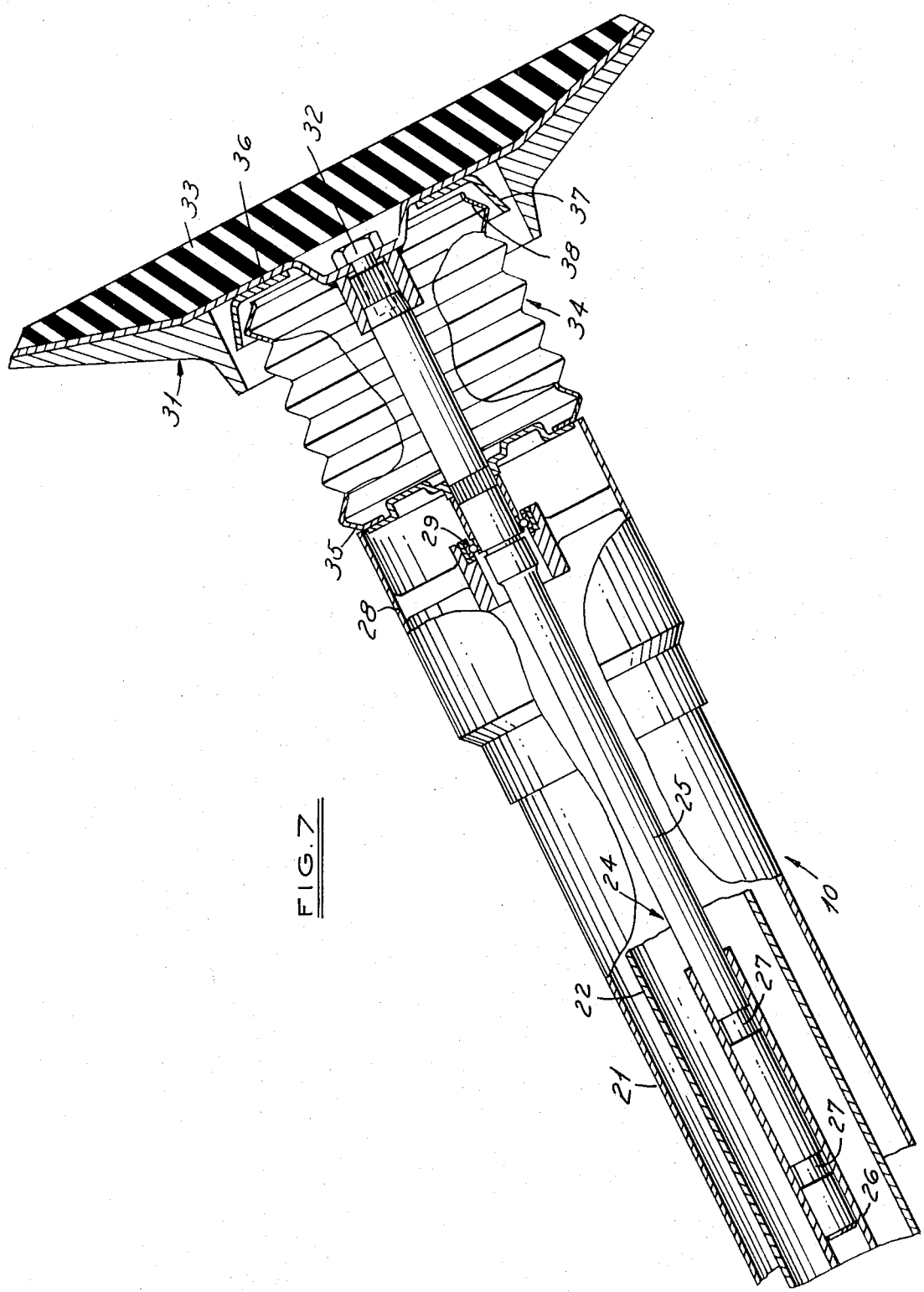
FIG. 7 is an enlarged view, partly in section, of the rearward end of the steering column.

Referring now to the drawings, wherein the presently preferred embodiment of this invention is disclosed, FIG. 1 shows a steering column assembly 10 for a motor vehicle that is constructed to absorb the kinetic energy of an impact load imposed upon its upper rearward end. The steering colum assembly 10 is secured to a support bracket 12 of the vehicle body by fore and aft spaced apart support assemblies 14 and 16. the support bracket 12 is secured to the fire wall 18 and to a portion of the instrument panel structure 20 of the vehicle.

The fore and aft support assemblies 14 and 16 are secured to a support tube 21 which constitutes the outer housing of the steering column assembly 10. The construction and function of the support assemblies 14 and 16 for the outer tube 12 will be described below.

A transmission shift tube 22 of one-piece construction is rotatably supported within the outer tube 21, in part, by a bearing 23.

A two-piece telescopic steering shaft assembly 24 is situated within the shaft tube 22. The shaft assembly 24 includes a rearward steering shaft section 25 and a forward steering shaft section 26. The shaft sections 25 and 26 are interconnected by friction means or by frangible means 27 that permits the two shaft sections 25, 26 to telescope under an axial load above a preset minimum.

An annular housing 28 of die-cast construction is rigidly secured to the rearward end of the outer tube 21 of the steering column. The housing 28 supports a bearing 29 which, in turn, rotatably supports the rearward steering shaft section 25. The housing 28 also supports the gear shift lever 30 which is connected to the transmission shift tube 22. The lower or forward end of the transmission 22 is linked to the vehicle transmission so that the lever 30 may be manipulated by the vehicle operator to select a desired transmission gear ratio in a well-known manner. In order to simplify the drawing and promote an understanding of this invention, the interconnection between the shift lever 30 and the upper end of the transmission shift tube 22 is not shown in FIG. 7.

The end of the rearward steering shaft section 25 protrudes from the housing 28 and is secured to the hub of a steering wheel 31 by means of a bolt 32. An energy absorbing pad 33 is mounted on the steering wheel 31.

A plastically deformable, energy absorbing, convoluted can 34 has its forward end 35 rigidly affixed to the annular housing portion 28 of the steering column 10.

The can 34 extends rearwardly to enclose the protruding end of the rearward steering shaft section 25. An annular member 36 is welded to the steering wheel 31 and has a generally axially extending annular flange 37 that overlaps and is spaced apart from the rearward end 38 of the convoluted can 34.

It is to be noted that the can 34 is secured only at its forward end 35 to the housing 10 and is otherwise spaced apart from the steering shaft assembly 24 and the steering wheel 31.

The steering shaft assembly 24 is connected at its forward end to a steering gear 40 by means of a flexible cable 42 that passes through an opening in the fire wall 18. A rubber boot 44 is positioned about the cable 42 to seal the opening in the fire wall against the passage of dust into the passenger compartment.

Reference is now made to FIG. 4 of the drawings which discloses the construction of the rearward steering column support assembly 16. In accordance with this invention, the rearward assembly 16 functions both as a breakaway or releasable support and as a slidable guide for the column tube 21.

FIG. 4 discloses the steering shaft assembly 24, the shift tube 22 and the outer tube 21 positioned in concentric relationship. A pair of semi-circular metal clips 46 and 47 are fitted about the tube 21. Transversely aligned apertures 48 and 49 are formed in the tube 21. The clips 46 and 47 have inwardly directed tabs 50 and 51 at each of their ends which are fitted into the apertures 48 and 49. The interconnection of the tabs 50, 51 with the apertures 48, 49 prevents the axial displacement of the semi-circular clips 46, 47 with respect to the tube 21.

A pair of semi-circular low friction plastic members 52 and 53 are positioned on the outer surface of the semi-circular clips 46 and 47. The plastic members 52 and 53, which may be made of a material such as Teflon, are bonded to the inner surface of a pair of semi-circular rubber members 54 and 55.

A pair of clamp members 56 and 57 have radially outwardly extending mating flanges 58, 59 and 60, 61. The clamp members 56 and 57 have semi-circular midportions 62 and 63 which combine to form an annular clamp assembly that encircles the rubber members 54 and 55. Outwardly extending locating tabs are provided on the ends of the semi-circular rubber members 54, 55 which fit into appropriate openings in the portions 62, 63 of the clamp members 56, 57.

The support bracket 12 has laterally extending flanges 64 and 65 to which the mating flanges 58, 59 and 60, 61 are rigidly secured by bolts. The bolts draw the clamp members 56 and 57 together to secure the clips 46, 47, the plastic members 52, 53 and the rubber members 54, 55 into a tight assembly that grips the outer column tube 21 during normal vehicle usage.

The releasable rearward support structure 16 secures the steering column assembly 10 to the body structure 12 so as to prevent rattling, with the interposed rubber members 54 and 55 isolating noise and vibration from the vehicle body. In addition, the support assembly 16 is designed to function as a guide for the axial displacement of the tube 21 after initial resistance when the tube is subjected to an axial impact load.

The forward support assembly 14 adjacent to the lower or forward end portion 66 of the outer tube 21 is illustrated in FIG. 3 cross section. The outer tube 21 is surrounded by a rigid collar member 68 that has laterally extending arms 70 and 72. The lateral arms 70 and 72 are connected to the flanges 64 and 65 of the bracket 12 by means of bolts 73 and 75.

The collar 68 is of generally annular configuration and is provided with a central opening 74 through which the forward end portion 66 of the tube 21 is fitted. Four circumferentially spaced apart, inwardly directed, projections 76 are provided on the interior surface of the opening 74. The forward end portion 66 of the tube 21 is provided with a series of four performed axially extending grooves 78 in which the projections 76 are positioned with an interference or press fit.

Each of the grooves 78, in which the projections 76 are seated, extends from the forward end of the column tube 21 to a point rearwardly of the projection 76 seated therein (see FIG. 6). The rearward ends of the grooves 78 are spaced rearwardly of the projections 76 by a distance that is approximately equal to the thickness of the pad 33 on the steering wheel 31 or in the approximate range of 1 inch to 1½ inches.

An annular plastic bushing 80 is fitted about the column tube 21 on the rearward side of the annular collar 68 as seen in FIG. 6. The bushing 80 is situated in the opening 74 of collar 68 and slidably engages the exterior surface of the tube 21.

A lock washer 82 is fitted about the tube 21 at its forward end adjacent to the rigid collar 68. As seen in FIGS. 2, 5 and 6, the lock washer 82 has radially inwardly directed teeth 84 that bite into the exterior surface of the tube 21. The washer 82 serves to secure the tube 21 of the steering column assembly 10 from moving rearwardly with respect to the support structure 14 during normal operation.

OPERATION

The steering column assembly 10 is maintained in its normal operating position by the engagement of the tube 21 with the fore and aft support assemblies 14 and 16. The projections 76 of the rigid collar 68 engage the grooves 78 with an interference fit and this prevents inadvertent displacement of the tube 21. The biting action of the teeth 84 of the washer 82 prevents rearward displacement of the tube 21. As noted in FIGS. 4 and 6, the locking washer 82 is positioned against the support collar 68.

During normal operation of the motor vehicle with which the steering column assembly 10 is associated, the column will function or perform in a conventional manner.

In the event a minor forwardly directed impact load is imposed upon the steering wheel 31, the pad 33 will deflect to absorb and dissipate the kinetic energy of the impact.

In the event a major impact load is imposed upon the steering wheel 31, a series of consecutive events will occur. During the initial phase of the impact, the resilient pad 33 will deflect to absorb a small portion of the load. As the pad 33 deflects, an increasing load will be transmitted through the column assembly 10 to its various components, including the frangible elements 27 for the steering shaft assembly 24 and the releasable rearward support 16 for the column tube 21. When the magnitude of the load builds up to a point where it exceeds a predetermined minimum value, the frangible elements 27 will fracture thereby permitting the rearward steering shaft section 25 to telescope into the forward steering shaft section 26.

After the frangible elements 27 are broken, the steering wheel 31 will move forwardly and the hub portion 36 will engage the upper end 38 of the convoluted can 34. As the steering wheel 31 continues to move under the force of the impact, the convoluted can 34 will be plastically deformed to absorb an additional portion of the kinetic energy of the impacting object. The can 34 will collapse in the manner of a concertina.

The force of the impact causing the convoluted can 34 to collapse will be transmitted through the steering column to the support assemblies 14 and 16. The rearward support assembly 16 will provide initial resistance to forward displacement of the column tube 21. When the impact force on the releasable support assembly 16 builds up to an amount exceeding its predetermined breakaway value, the column tube 21 will begin to slide forwardly.

Upon initial movement of the steering column tube 21, the plastic members 52 and 53 of the rearward support assembly 16 will slide on the clips 46 and 47 which will be retained on the tube 21 by the tabs 50 and 51. After some additional movement, the plastic members 52 and 53 will be axially displaced from the clips 46 and 47 so that the plastic members 52 and 53 will be spaced from the column tube 21 by a dimension approximately equal to the thickness of the clips 46 and 47.

Thus, the rearward support assembly 16 will provide a loose sliding support for the column tube 21 during collapse under impact after initially resisting such movement.

In the forward support assembly 14, the deforming projections 76 are spaced from the rearward end of the preformed grooves 78 and, consequently, only the nominal resistance of the interference fits between the projections 76 and the grooves 78 will resist initial forward displacement of the tube 21. The rearward ends of the grooves 78 are spaced from the projections 76 by a sufficient distance to permit the rear releasable support assembly 16 to break its grip on the outer column tube 21.

A portion of the impact load will be used in overcoming the inertia of the mass of the steering column 10 and accelerating it forwardly to a speed coinciding with the speed of the object which struct the steering wheel 31. After the column 10 has been accelerated to a speed common with the velocity of the impacting object, the projections 76 will engage the rearward ends of the grooves 78 and further forward displacement of the tube 21 will cause the projections 76 to plow extensions of the grooves 78 along the surface of the column tube 21. This plastic deformation of the outer tube 21 will absorb the kinetic energy of the object striking the steering wheel 31.

With a steering column construction of this invention, the resistance provided by deflection of the energy absorbing steering column pad 31, the fracture of the frangible elements 27 in the steering shaft assembly 24, collapse of the convoluted can 34, the disengagement of the releasable rearward support assembly 16, the acceleration of the column assembly 10 up to the speed of the impacting object and the plowing of the surface grooves in the column tube 21 will occur consecutively or in a serial manner. Consequently, the steering column 10 of FIG. 1 will provide a uniform resistance to dissipate the kinetic energy of the impact.

Unlike some prior art structures, the force required to accelerate the steering column to the speed of the impacting object (the inertial force) and the force required to release the column from the releasable rearward support (the breakaway force) will not be superimposed upon the resistance force provided by the plastic deformation of the surface of the column tube (the energy absorbing force). As a consequence, objectionable high peak loads will be avoided.

In a preferred embodiment of the invention, the spacing between the projections 76 and the rearward end of the grooves 78 is in the range of 1 inch to 1½ inches. The spacing is approximately equal to the thickness of the pad 33 on the steering wheel 31. This spacing permits acceleration of the mass of the column assembly 10 up to a speed coinciding with the speed of the impacting object, with the acceleration occurring after the releasable support 16 releases its grip upon the column tube 21 and before the surface of the tube 21 is plastically deformed by the projections 76.

The interference fits between the projections 76 and the grooves 78, in combination with the support of the rearward assembly 16, provide sufficient rigidity to the support of the steering column 10 so that it can perform in a conventional fashion during normal vehicle operation. The interference fits provide nominal initial resistance to the forward acceleration of the column 21 when it is moving under the force of an impact load.

It is to be noted that the convoluted can 34 is supported only at its forward end. The can 34 is stationary. It is not connected to the steering wheel and does not function to transmit steering torque from the wheel 31 to the steering shaft as is the case in certain prior art structures. In addition, the can 34 does not function as a support for a bearing engaging the steering shaft which is also true of other prior art structures. The convoluted can 34 is designed to provide the desired resistance to plastic deformation. Because this is the sole function of the can 34, its design need not be compromised as would be the case if it were required to carry torsional loads such as steering torque or bending loads if it were a support for the steering shaft.

The foregoing description presents the presently preferred embodiment of this invention. Alterations and modifications may occur to those skilled in the art which will come within the scope and spirit of the following claims.

We claim:

1. An energy absorbing steering column for a motor vehicle having a plurality of energy absorbing means including:
    an outer steering column tube,
    vehicle support structure,
    releasable tube support means operatively connecting said outer column tube to said support structure,
    said releasable tube support means being constructed to disconnect said column tube from said support structure in response to a force above a predetermined minimum value,
    major energy absorbing means constructed to plastically deform said tube upon axial displacement of said tube and thereby absorb the major portion of a major impact load on said steering column,
    a steering shaft assembly rotatably supported in said column tube,
    said steering shaft assembly comprising telescopically arranged forward and rearward steering shaft sections,
    releasably interconnecting means operatively interconnecting said steering shaft sections,
    said releasable interconnecting means being constructed to release the interconnection between said shaft sections in response to a load above a predetermined minimum value,
    said rearward steering shaft section having a rearward portion extending rearwardly from the end of said column tube,
    a steering wheel secured to the end of said rearward portion of said rearward steering shaft section,
    a rearwardly facing energy absorbing pad secured to said steering wheel,
    a plastically deformable annular member disposed concentrically about said extending rearward portion of said rearward shaft section,
    said deformable annular member comprising a sheet metal convoluted can,
    said deformable annular member being secured to the rearward end of said column tube and spaced apart from both said steering shaft assembly and said steering wheel whereby said annular member is substantially free of bending loads and torsion loads during normal operation of said steering column,
    said steering wheel and said rearward steering shaft section being displaceable in a forward direction in response to a forwardly directed impact load on said energy absorbing pad that releases said releasable interconnecting means whereby said steering wheel is displaced forwardly into engagement with said annular member and said annular member is plastically deformed to absorb an initial portion of said impact load and said steering column tube and said column tube is displaced forwardly whereby said major energy absorbing means absorbs a major portion of said impact load.

* * * * *